(12) United States Patent
Adams et al.

(10) Patent No.: US 11,806,977 B2
(45) Date of Patent: Nov. 7, 2023

(54) FLEXIBLE COMPOSITE SYSTEMS AND METHODS

(71) Applicant: DSM IP ASSETS B.V., Heerlen (NL)

(72) Inventors: Christopher Michael Adams, Mesa, AZ (US); Wesley Edward Hatcher, Mesa, AZ (US); Keith Joel McDaniels, Phoenix, AZ (US)

(73) Assignee: AVIENT PROTECTIVE MATERIALS B.V., Geleen (NL)

( * ) Notice: Subject to any disclaimer, the term of this patent is extended or adjusted under 35 U.S.C. 154(b) by 119 days.

(21) Appl. No.: 17/372,296

(22) Filed: Jul. 9, 2021

(65) Prior Publication Data

US 2021/0402735 A1    Dec. 30, 2021

Related U.S. Application Data

(63) Continuation of application No. 14/774,581, filed as application No. PCT/US2014/026796 on Mar. 13, 2014, now Pat. No. 11,072,143.

(Continued)

(51) Int. Cl.
*B32B 5/02* (2006.01)
*B32B 5/26* (2006.01)
(Continued)

(52) U.S. Cl.
CPC ............. *B32B 5/028* (2013.01); *B32B 5/022* (2013.01); *B32B 5/024* (2013.01); *B32B 5/10* (2013.01); *B32B 5/12* (2013.01); *B32B 5/26* (2013.01); *B32B 27/12* (2013.01); *B32B 27/322* (2013.01); *B32B 27/34* (2013.01); *B32B 27/36* (2013.01); *B32B 27/40* (2013.01); *B32B 37/12* (2013.01); *B32B 38/10* (2013.01); *B32B 2038/0072* (2013.01); *B32B 2260/00* (2013.01); *B32B 2260/021* (2013.01); *B32B 2260/023* (2013.01);
(Continued)

(58) Field of Classification Search
CPC ......... B32B 5/028; B32B 5/022; B32B 5/024; B32B 5/10; B32B 5/12; B32B 5/26; B32B 27/12; B32B 27/322; B32B 27/34; B32B 37/12; B32B 38/10; B32B 5/02; B32B 5/24; B23B 27/40
USPC ........................................ 156/168, 167, 166
See application file for complete search history.

(56) References Cited

U.S. PATENT DOCUMENTS 2,418,904 A * 4/1947 Rugeley ................ D06M 17/06
                                                      156/308.2
4,109,543 A * 8/1978 Foti .......................... B32B 27/32
                                                         156/137

(Continued)

FOREIGN PATENT DOCUMENTS

WO    WO-9411185 A1 * 5/1994 ............. B29C 70/44
WO    WO-2011163643 A1 * 12/2011 ............. B05D 1/286

*Primary Examiner* — Linda L Gray
(74) *Attorney, Agent, or Firm* — Snell & Wilmer L.L.P.

(57) ABSTRACT

In various embodiments, an improved flexible-composite material is described that comprises at least one scrim constructed from at least two unidirectional tape layers bonded together and at least one woven fabric, non-woven fabric, or membrane bonded to the scrim. In various embodiments, the unidirectional tape layers comprise a plurality of parallel fiber bundles comprising monofilaments within an adhesive resin. In various embodiments, the fiber bundles are separated by gaps that can be filled in by adhesive or non-adhesive resin.

10 Claims, 2 Drawing Sheets

Related U.S. Application Data

(60) Provisional application No. 61/780,821, filed on Mar. 13, 2013.

(51) Int. Cl.
*B32B 5/10* (2006.01)
*B32B 5/12* (2006.01)
*B32B 38/10* (2006.01)
*B32B 27/12* (2006.01)
*B32B 27/32* (2006.01)
*B32B 27/34* (2006.01)
*B32B 27/36* (2006.01)
*B32B 27/40* (2006.01)
*B32B 37/12* (2006.01)
*B32B 38/00* (2006.01)

(52) U.S. Cl.
CPC ..... *B32B 2260/046* (2013.01); *B32B 2305/08* (2013.01); *B32B 2305/18* (2013.01); *B32B 2305/38* (2013.01); *B32B 2307/546* (2013.01); *B32B 2307/724* (2013.01); *Y10T 442/184* (2015.04); *Y10T 442/197* (2015.04)

(56) References Cited

U.S. PATENT DOCUMENTS

| | | | | |
|---|---|---|---|---|
| 4,173,670 | A * | 11/1979 | VanAuken | B32B 1/08 138/131 |
| 4,679,519 | A * | 7/1987 | Linville | B32B 5/26 442/287 |
| 9,180,623 | B1 * | 11/2015 | Iliev | F41H 5/04 |
| 2010/0088980 | A1 * | 4/2010 | Russo | E04H 9/022 52/167.7 |

* cited by examiner

FLEXIBLE COMPOSITE SYSTEMS AND METHODS

CROSS-REFERENCE TO RELATED APPLICATION

This application is a continuation of, claims priority to and the benefit of, U.S. patent application Ser. No. 14/774,581 filed on Sep. 10, 2015, (now U.S. Pat. No. 11,072,143), entitled "FLEXIBLE COMPOSITE SYSTEMS AND METHODS", which is a U.S. national stage entry under 35 U.S.C. § 371 of international Application No. PCT/US2014/026796 filed Mar. 13, 2014, entitled "FLEXIBLE COMPOSITE SYSTEMS AND METHODS," which claims priority to, and the benefit of, U.S. Provisional Patent Application Ser. No. 61/780,821, filed Mar. 13, 2013, which is hereby incorporated by reference in its entirety.

FIELD OF THE INVENTION

This invention relates generally to improved flexible composites and more particularly to improved flexible composites comprising unidirectional fiber-reinforced layers and scrim reinforcements and manufacturing methods for making the same.

BACKGROUND OF THE INVENTION

Flexible-composite materials are widely used in applications requiring both mechanical flexibility and high strength-to-weight ratios. Although flexible-composite materials may be considered a specialized subset of the larger body composite-materials, their importance in many specific areas of technology is significant.

As the term suggests, composite materials combine two or more constituent materials to form a unified material composition. An example of a flexible composite material would be a polymer matrix embedding an arrangement of flexible fibers.

Utilization of flexible-composite materials is envisioned in many technical fields ranging from simple consumer products to advanced aerospace applications. Thus, a system for quickly and economically producing high-quality flexible-composite materials would be of benefit to many.

SUMMARY OF THE INVENTION

Various embodiments of the present disclosure generally comprise flexible-composite materials that include scrim reinforcement. A composite material contains one or more unidirectional fiber-reinforced layers each having thinly spread parallel fibers coated with adhesive (these layers are termed unitapes). In accordance with one aspect of the present invention, the thin unitape layers can be manufactured using fiber bundles consisting of a plurality of monofilaments that are combined with a polymer resin and pultruded through a rotary die such that the monofilaments are spread and oriented parallel to each other. In accordance with another aspect, the composite material includes a woven or non-woven reinforcement laid scrim. Laid scrim is a lower cost reinforcing fabric made from continuous filament yarn in an open mesh construction. The laid scrim manufacturing process chemically bonds non-woven yarns together, enhancing the scrim with unique characteristics. The laid scrim is a cost effective way to add fiber reinforcement to a composite material especially in bias orientations (for example, about +/−30°, +/−45°, +/−60° because the added processing steps to add unitape bias plies are skipped and replaced by inserting a pre-manufactured scrim. The laid scrim may be pre-coated with adhesive, pre-laminated to supporting films, or it may be necessary to sandwich it between unitape layers to glue it in place.

Another embodiment of the present disclosure generally comprises gapped flexible-composite materials made from two or more layers of unitapes that have adhesive and fiber free spaces to form a scrim. Thin unitape layers are manufactured using fiber bundles consisting of a plurality of monofilaments that are combined with a polymer resin and pultruded through a rotary die such that the monofilaments are spread and oriented parallel to each other. The key feature of this embodiment is that the fibers that make up the unitape are spread and either the distance between fibers is gapped such that an adhesive-free and fiber-free space between each group of monofilaments is formed, or fiber tows are removed after the monofilaments have been spread resulting in a similarly gapped unitape. A scrim is formed by bonding two or more of these unitape layers together. Additional films, membranes, fabrics, random oriented non-wovens, oriented non-wovens, scrims, or coatings may be applied to the outer surfaces or layered within this composite material.

Various embodiments include a reinforcement type that is a random oriented non-woven, or oriented non-woven constructed from engineering fibers such as, but are not limited to, UHMWPE (e.g. Spectra®, Dyneema®), aramids (e.g. Kevlar®), liquid crystal polymers (e.g. Vectran®), carbon fiber of various grades, PBO (e.g. Zylon®), nylon, polyester (Rayon), PEN, Nomex and other fire proof, high temperature fibers, steel or other metal fibers, and combinations thereof. This reinforcement layer may be bonded, fused, impregnated, extruded or coated to combine the reinforcement with a monolithic film (PET, Nylon, ECTFE, urethane, etc.), breathable membranes (Teflon, urethane, microporous, etc.), solvent or waterbased dispersion, woven or non-woven fabrics, leather, unidirectional tape, or other layers.

In various embodiments, the present disclosure encompasses a method of manufacturing a flexible-composite material, said method comprising providing at least one scrim layer and bonding at least one woven fabric, non-woven fabric, and/or membrane layer onto said at least one scrim layer. In various embodiments, the scrim layer comprises at least two unidirectional tape layers further comprising a plurality of parallel fiber bundles comprising monofilaments in an adhesive resin, wherein the fiber bundles are separated by gaps. In various embodiments, the scrim layer comprises a commercially available woven or non-woven reinforcement laid scrim. In various embodiments, the method further comprises the step of adding a breathable or non-breathable adhesive to fill said gaps.

In various embodiments, a method of manufacturing a flexible-composite material comprises: producing thin unitape layers comprising fiber bundles consisting of a plurality of monofilaments by combining said monofilaments with a polymer resin and pultruding said monofilaments through a rotary die such that said monofilaments are spread by gaps and oriented parallel to each other; producing a scrim layer by combining at least two of said thin unitape layers; and bonding at least one of a woven fabric, non-woven fabric, and/or membrane layer onto at least one of said scrim layers. In various embodiments, the method further comprises the step of removing monofilaments to create and/or to augment said gaps. In various embodiments, the method further comprises adding a breathable or non-breathable adhesive to fill the gaps.

DETAILED DESCRIPTION OF THE INVENTION

Figure 1:
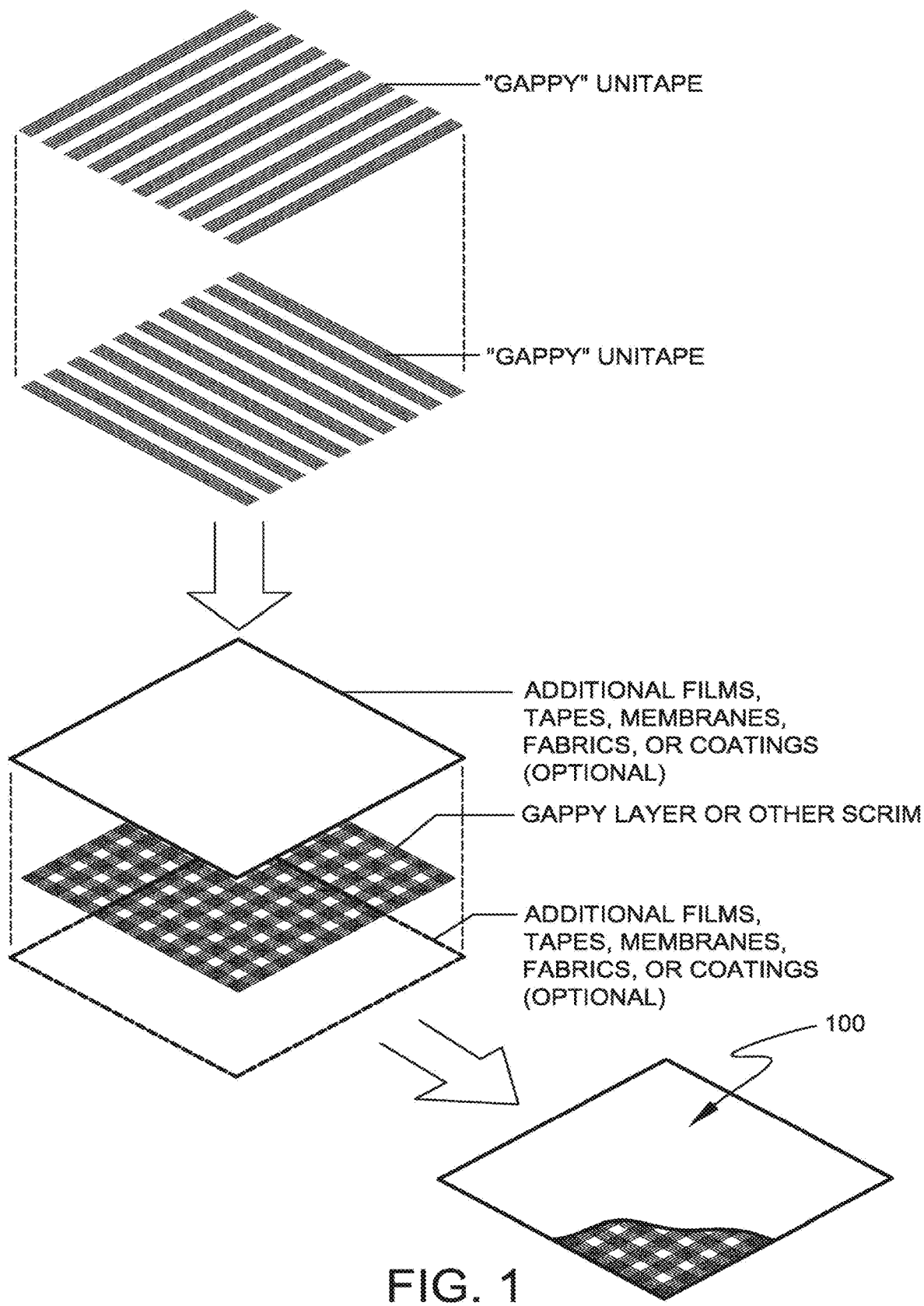
FIG. 1 shows a partial perspective view diagrammatically illustrating a product in accordance to the present disclosure where unitapes are oriented in two directions and combined with a scrim and outer surface coatings to form a composite material.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

As described in more detail herein, various embodiments of the present disclosure generally comprise flexible-composite materials comprising at least one scrim reinforcement.

TABLE 1 provides a glossary of terms and definitions that may be used in various portions of the present disclosure.

TABLE 1

| \multicolumn{2}{c}{BRIEF GLOSSARY OF TERMS AND DEFINITIONS} |  |
|---|---|
| Adhesive | A resin used to combine composite materials. |
| Anisotropic | Not isotropic; having mechanical and or physical properties which vary with direction at a point in the material. |
| Areal Weight | The weight of fiber per unit area, often expressed as grams per square meter (g/m$^2$). |
| Autoclave | A closed vessel for producing a pressurized environment, with or without heat, to an enclosed object, which is undergoing a chemical reaction or other operation. |
| B-stage | Generally defined herein as an intermediate stage in the reaction of some resins. Materials are sometimes pre-cured to this stage, called "prepregs", to facilitate handling and processing prior to final cure. |
| C-Stage | Final stage in the reaction of certain resins in which the material is relatively insoluble and infusible. |
| Cure | To change the properties of a polymer resin irreversibly by chemical reaction. Cure may be accomplished by addition of curing (cross-linking) agents, with or without catalyst, and with or without heat. |
| Decitex (dtex) | Unit of the linear density of a continuous filament or yarn, equal to 1/10th of a tex or 9/10th of a denier. |
| Filament | The smallest unit of a fiber-containing material. Filaments usually are of long length and small diameter. |
| Polymer | An organic material composed of molecules of monomers linked together. |
| Prepreg | A ready-to-cure sheet or tape material. The resin is partially cured to a B-stage and supplied to a layup step prior to full cure. |
| Scrim | Light woven or non-woven fabric with relatively large openings between the yarns |
| Tow | An bundle of continuous filaments. |
| UHMWPE | Ultra-high-molecular-weight polyethylene. A type of polyolefin made up of extremely long chains of polyethylene. Trade names include Spectra ® and Dyneema ®. |

TABLE 1-continued

| \multicolumn{2}{c}{BRIEF GLOSSARY OF TERMS AND DEFINITIONS} |  |
|---|---|
| Unitape | Unidirectional tape (or UD tape)—flexible reinforced tapes (also referred to as sheets) having uniformly-dense arrangements of reinforcing fibers in parallel alignment and impregnated with an adhesive resin. UD tapes are typically B-staged and can be used as layers for the composites herein. |

Scrim Reinforced Flexible Composite Materials

In accordance with various embodiments, this disclosure provides a composite material that includes a scrim reinforcing element and at least two unidirectional tapes having monofilaments therein, all of such monofilaments lying in a predetermined direction within the tapes, wherein such monofilaments have diameters less than about 60 microns and wherein spacing between individual monofilaments within an adjoining strengthening group of monofilaments is within a gap distance in the range between abutting and/or stacked monofilaments up to about 300 times the monofilament major diameter.

In accordance with one aspect of the present invention, the thin unitape layers can be manufactured using fiber bundles consisting of a plurality of monofilaments that are combined with a polymer resin and pultruded through a rotary die such that the monofilaments are spread and oriented parallel to each other. In accordance with another aspect, the composite material includes a woven or non-woven reinforcement laid scrim, such as material produced by Saint-Gobain ADFORS.

In general, laid scrim is a lower cost reinforcing fabric made from continuous filament yarn in an open mesh construction. The laid scrim manufacturing process chemically bonds non-woven yarns together, enhancing the scrim with unique characteristics. The laid scrim is a cost effective way to add fiber reinforcement to a composite material, especially in bias orientations (for example, about +/−30°, +/−45°, +/−60° because the added processing steps to add unitape bias plies are skipped and replaced by inserting a pre-manufactured scrim. The laid scrim may be pre-coated with adhesive, pre-laminated to supporting films, or it may be necessary to sandwich it between unitape layers to glue it in place.

Additional films, laid scrims, membranes, fabrics, or coatings may be applied to the outer surfaces or layered within this composite material.

Scrim fiber types usable in the present system include, but are not limited to: Nylon, Polyester, UHPWPE (Spectra, Dyneema), para-Aramids (Kevlar, Nomex, Technora, Twaron), Liquid Crystal Polymer (Vectran), Polyimide, other synthetic polymers (PBO, PBI, PIBT, PBZT, PLA, PPTA), metal fiber, glass fiber, or any combinations thereof.

Scrim features and benefits include: dimensional stability, tensile strength, tear resistance.

TABLE 2

| TECHNICAL CAPABILITIES AND SCRIM CHARACTERISTICS | |
|---|---|
| TECHNICAL CAPABILITIES | SCRIM CHARACTERISTICS |
| Width | Approximately 35 to about 5500 mm, e.g. about 38 to about 5300 mm |
| Roll length | Up to approximately 120,000 m |
| Yarns | Glass, polyester, nylon, UHMWPE, aramid, Twaron ® |

TABLE 2-continued

TECHNICAL CAPABILITIES AND SCRIM CHARACTERISTICS

| TECHNICAL CAPABILITIES | SCRIM CHARACTERISTICS |
| --- | --- |
| Construction Patterns | Square, tri-, and quad-directional From about 0.2 yarns/cm to about 4 yarns/cm (about 0.5 yarn/in to about 18 yarns/in) |
| Tensile strength range | From approximately 17.5 to 568 N/5 cm in each direction |
| Bonding | PVOH, SBR, EVA, PVC, acrylic, etc. |
| Complexes for combination materials | A scrim bonded to any of glass, non-woven, polyester non-woven, specialty non-woven, film, etc. |

Scrim Construction Patterns

In various embodiments, scrim construction patterns that find use in various embodiments of the flexible-composites of the present disclosure, include, but are not limited to, "side-by-side," "over/under," "tri-directional," "quad-directional," and "complexes," each of which are described in more detail in TABLE 3 below.

TABLE 3

CONSTRUCTION PATTERNS:

Side by side

The simplest laid scrim pattern, the yarns from the top and bottom warp (machine direction) yarns lie next to each other with the fill (cross machine) yarns in between set at a 90° angle.

Over/Under

Yarns from the two warp sheets lie directly on top of each other. The fill yarns are also set at a 90° angle. This construction offers increased dimensional stability.

Tri-directional

Angled fill yarns are added to provide better aesthetics and redistributed strength.

Quad-directional

Various scrims are bonded together chemically or thermally for increased strength and dimensional stability.

Complexes

Scrim can be used individually or can be bonded to other substrates such as glass mat, synthetics, film and more.

"GAPPY" Flexible-Composite Materials

A composite material in accordance with various embodiments of the present disclosure contains one or more unidirectional fiber-reinforced layers each having thinly spread parallel fibers coated with adhesive (these layers are termed unitapes). In accordance with one aspect, the thin unitape layers can be manufactured using fiber bundles consisting of a plurality of monofilaments that are combined with a polymer resin and pultruded through a rotary die such that the monofilaments are spread and oriented parallel to each other. In various embodiments, the fibers that make up the unitape are spread and, either the distance between fibers is "gapped" such that an adhesive and fiber free space between each group of monofilaments is formed, or fiber tows are removed after the monofilaments have been spread resulting in a similarly gapped unitape. A scrim can be formed by bonding two or more of these unitape layers together. In an alternative embodiment, the filaments that make up each fiber are overspread to form a "gappy" unitape. In this embodiment the distance between filaments is "gapped" such that an adhesive and fiber free space is formed.

In various embodiments, a breathable or non-breathable adhesive may be used to fill the gaps.

In various embodiments, the present disclosure encompasses a method of manufacturing a flexible-composite material, said method comprising: providing at least one scrim layer; and bonding at least one woven fabric, non-woven fabric, and/or membrane layer onto said at least one scrim layer. In various embodiments, the scrim layer comprises at least two unidirectional tape layers further comprising a plurality of parallel fiber bundles comprising monofilaments in an adhesive resin, wherein the fiber bundles are separated by gaps. In various embodiments, the scrim layer comprises a commercially available woven or non-woven reinforcement laid scrim. In various embodiments, the method further comprises the step of removing monofilaments from at least one of the unidirectional tape layers to create and/or to augment said gaps. In various embodiments, the method further comprises the step of adding a breathable or non-breathable adhesive to fill said gaps.

In various embodiments, a method of manufacturing a flexible-composite material comprises: producing thin unitape layers comprising fiber bundles consisting of a plurality of monofilaments by combining said monofilaments with a polymer resin and pultruding said monofilaments through a rotary die such that said monofilaments are spread by gaps and oriented parallel to each other; producing a scrim layer by combining at least two of said thin unitape layers; and bonding at least one of a woven fabric, non-woven fabric, and/or membrane layer onto at least one of said scrim layers. In various embodiments, the method further comprises the step of removing monofilaments from at least one of the unitapes to create and/or to augment said gaps. In various embodiments, the method further comprises adding a breathable or non-breathable adhesive to fill the gaps.

As illustrated in FIG. 1, a flexible composite 100 comprises (a) a scrim or gappy layer comprising two or more unitape layers; and (b) one or more films, tapes, membranes, fabrics, or coatings disposed on either or both sides of the scrim. In the embodiment of FIG. 1 for example, unitapes are oriented in two directions (0°/90°) and combined with a scrim or other gappy layer and optional outer surface coatings to form a composite material.

Figure 2:
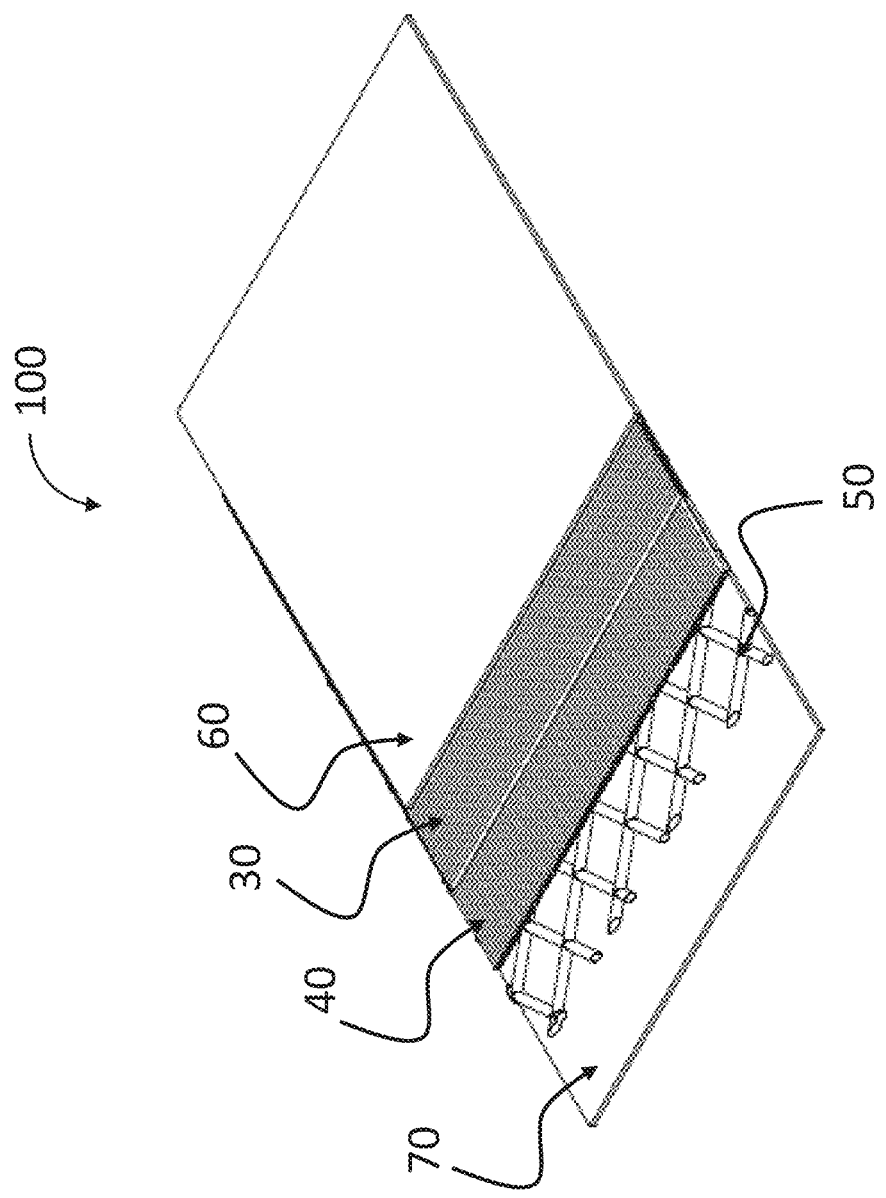
FIG. 2 shows a partial perspective view diagrammatically illustrating a product in accordance to the present disclosure where gappy unitapes are oriented in two directions and combined with outer surface coatings to form a composite material.

FIG. 2 diagrammatically illustrates an embodiment of a flexible composite 100 in accordance to the present disclosure where gappy unitapes 30 and 40 are oriented in two directions (approximately 0°/90°) and combined with both a scrim 50 and outer surface coatings 60 and 70 to form a composite material 100.

The above mentioned "Gappy" Flexible Composite product is useful because it can be used in breathable membrane applications due to the adhesive/fiber free gaps. This material may weigh less than a version with a continuous layer of filaments. Additionally this composite material may have improved drape and moldability compared to a version with a continuous layer of filaments.

In various embodiments, additional films, scrims, gappy layers, membranes, fabrics, random oriented non-wovens, oriented non-wovens, or coatings may be applied to the outer surfaces or layered within this composite material.

Various embodiments include a reinforcement type that is a random oriented non-woven, or oriented non-woven constructed from engineering fibers such as, but are not limited to, UHMWPE (e.g. Spectra®, Dyneema®), aramids (e.g. Kevlar®), liquid crystal polymers (e.g. Vectran®), carbon fiber of various grades, PBO (e.g. Zylon®), nylon, polyester (Rayon), PEN, Nomex and other fire proof, high temperature fibers, steel or other metal fibers, and combinations thereof. This reinforcement layer may be bonded, fused, impregnated, extruded or coated to combine the reinforcement with a monolithic film (PET, Nylon, ECTFE, urethane, etc.), breathable membranes (Teflon, urethane, microporous, etc.), solvent or waterbased dispersion, woven or non-woven fabrics, leather, unidirectional tape, or other layers.

In accordance with various embodiments, this disclosure provides a product wherein such at least one unidirectional tape is attached to such product.

In various embodiments, the flexible-composite materials of the present disclosure can be fine-tuned, at desired places on a product, to impart desired directional control of rigidity, flexibility and elasticity.

In various embodiments of the present disclosure, such a system comprises essentially one or more continuous "roll-to-roll" production process. In various embodiments, such a system is efficient, inexpensive, and useful.

In various embodiments of the present disclosure, the material layers are combined and cured together using pressure and temperature either by passing the stacked layers through a heated set of nips rolls, a heated press, a heated vacuum press, a heated belt press or by placing the stack of layers into a vacuum lamination tool and exposing the stack to heat. Moreover, external pressure, such as provided by an autoclave, may also be used to increase the pressure exerted on the layers. The vacuum lamination tool may be covered with a vacuum bag sealed to the lamination tool with a vacuum applied to provide pressure. Other lamination methods may also be suitable as would be known to one skilled in the art.

It should be noted that some low-surface-energy fibers require surface-energy modification prior to coating to promote bonding of the coating. Exemplary surface treatments include flame treatment, corona, plasma, and/or chemical treatment process. Subsequent, coating processes include, but are not limited to, curtain coating, gap coating, gravure coating, immersion coating, knife-over-roll coated, metered rod coating, reverse roll coating, roller coating, and extrusion coating.

Methods to partially or completely cure the above-noted coating include, but are not limited to: heated rolls, ovens, vacuum ovens, using light, Infrared, and/or UV curing. In one embodiment of the present system, a low temperature curing adhesive is used because the selected fabric is especially temperature sensitive. UWMWPE fabrics, for example, decompose at temperatures greater than 300° F. and the advised short-term duration temperature limit is 145° C. In another embodiment, a thermoset or partially thermoset adhesive is used because this coating is more robust and does not degrade with heat and UV exposure. In another embodiment, a thermoplastic adhesive is used, such as urethane, when subsequent bonding and seaming processes require a thermoplastic coating. If adhesive is only partially cured during coating process, a subsequent curing step is used to fully cure the product, subsequent curing methods include heated rolls, ovens, vacuum ovens, using light, Infrared, or UV curing, and/or autoclaves.

In another embodiment of the present system, the uncured or partially cured coated fabrics described in the previous embodiments proceed to an autoclave curing process. The uncured or partially cured coated fabric is placed between layers of release liner (e.g. comprising a fluoro-polymer film, e.g. Teflon), next applied are layers of peel ply and breather, and the stack sealed in a vacuum bag onto a hard caul. The autoclave uses controlled temperature, pressure, and vacuum to remove entrapped air and volatiles from the coating and flow the coating across the surface and through the thickness of the fabric.

In various embodiments, unitape sheets are layered in multiple orientations to form a two directional fiber reinforced sheet (such as approximately 0°/90°, +45°/−45°, +30°/−30°), or a four directional fiber reinforced sheet (such as approximately 0°/90°/45°/−45°, 0°/90°/30°/−30°), or other "custom" oriented fiber reinforced sheet with an endless number of orientations and layer combinations.

In various embodiments, at least one plastic film, such as PET, PEN, Nylon, fluoro-polymer, urethane, or others, is laminated to one or both sides of the above-mentioned embodiments, or alternately between layers of the above-mentioned embodiments, prior to the curing process. In other embodiments, a non-impregnated or impregnated fabric is laminated to one or both sides of the previous embodiments, or between layers of the above-mentioned embodiments, prior to the curing process.

In various embodiments, the composite material may include coloration of the matrix or membranes through use of pigments or dye sublimation.

In various embodiments, a fire retardant adhesive or polymer may be used, or fire retardants can be added to an otherwise flammable matrix or membrane to improve the flame resistance. Flame retardance or self-extinguishing matrix resins, or laminating or bonding adhesives such as Lubrizol 88111, can be used either by themselves, or in combination with fire retardant additives. Examples of retardant additives include: DOW D.E.R. 593 Brominated Resin, DOW Corning 3 Fire Retardant Resin, and polyurethane resin with Antimony Trioxide (such as EMC-85/10A from PDM Neptec ltd.), although other fire retardant additives may also be suitable. Fire retardant additives that may he used to improve flame resistance include Fyrol FR-2, Fyrol HF-4, Fyrol PNX, Fyrol 6, and SaFRon 7700, although other additives may also be suitable. Fire retardancy and self-extinguishing features can also be added to the fibers either by using fire retardant fibers such as Nomex or Kevlar, ceramic or metallic wire filaments, direct addition of fire retardant compounds to the fiber formulation during the fiber manufacturing process, or by coating the fibers with a sizing, polymer or adhesive incorporating fire retardant compounds listed above or others as appropriate. Any woven or scrim materials used in the laminate may be either be pretreated for fire retardancy by the supplier or coated and infused with fire retardant compounds during the manufacturing process.

In various embodiments, anti-microbial/anti-pathogen resistance may be added to the composite material by the incorporation of one or more of anti-microbial agents added or coated onto the polymer resins, or fabrics, and anti-microbial treatments to the fibers, monofilaments, threads or tows used for composite material. Typical materials include, but are not limited to, OXiTitan Antimicrobial, nano silver compounds, Sodium pyrithione, Zinc pyrithione 2-Fluoro-ethanol, 1-Bromo-2-fluoroethane, BenzimidaZole, Fleroxacin, 1,4-Butanedisulfonic acid disodium salt, 2-(2-pyridyl) isothiourea N-oxide hydrochloride, Quarternary ammonium salt, 2-Pyridinethiol 1-oxide, Compound Zinc pyrithione, Compound copper pyrithione, magnesium pyrithione, BIS-PYRITHIONE, pyrithione, ot-Bromo Cinnam-Gel, KFO ABC Silica Gel manufactured. Fiber forms such as threads, tows and monofilaments can be treated with silver or other metal nanoparticles, or can have silver or other metal coatings applied via chemical or electrical plating, vacuum deposition or coating with a silver or metal compound containing polymer, adhesive or sizing; these coating can enhance electrical properties as well as anti-microbial/anti-pathogen properties. The anti-microbial/anti-pathogen materials may also be suitable.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the disclosure, to the full extent indicated by the broad, general meaning of the terms in which the appended claims are expressed. To the extent that these various modifications do not depart from the spirit and scope of the appended claims, they are intended to be encompassed therein.

What is claimed is:

1. A method of manufacturing a flexible-composite material, the method comprising:
    producing gapped unidirectional tape layers comprising spaced-apart fiber bundles, each fiber bundle consisting of a plurality of parallel monofilaments, by combining said monofilaments with a polymer resin and pultruding said monofilaments through a rotary die such that said fiber bundles are parallel and separated by adhesive and fiber free gaps;
    producing a scrim by combining at least two of said unidirectional tape layers together at a bias; and
    bonding at least one of a woven fabric, a nonwoven fabric, a film layer, or a membrane layer on one or both sides of said scrim to produce the flexible-composite material.

2. The method of claim 1, further comprising augmenting the adhesive and fiber free gaps by removing some of the fiber bundles from at least one of the unidirectional tape layers.

3. The method of claim 2, wherein augmenting the adhesive and fiber free gaps results in fiber bundle separations of from about 0.2 fiber bundles/cm to about 4 fiber bundles/cm.

4. The method of claim 1, further comprising filling the adhesive and fiber free gaps with a breathable or non-breathable adhesive.

5. The method of claim 1, wherein producing the scrim comprises orienting two unidirectional tape layers relative to one another such that the spaced-apart fiber bundles of parallel monofilaments in one of the unidirectional tape layers is biased at 90° relative to the spaced-apart fiber bundles of parallel monofilaments in the other unidirectional tape layer.

6. The method of claim 1, wherein the monofilaments comprise ultra-high molecular weight polyethylene.

7. The method of claim 1, wherein the film layer comprises any one of PET, PEN, Nylon, fluoropolymer, and urethane.

8. The method of claim 1, further comprising laminating at least one non-impregnated fabric to one or both sides of said flexible-composite material.

9. The method of claim 1, wherein producing the scrim further comprises laminating a non-impregnated fabric between the two unidirectional tape layers that are combined together at the bias.

10. The method of claim 1, further comprising laminating at least one non-impregnated fabric to one or both sides of said scrim prior to bonding at least one of the woven fabric, the nonwoven fabric, the film layer, or the membrane layer on the one or both sides of said scrim to produce the flexible-composite material.

* * * * *